US010600590B2

(12) United States Patent
Baraldi et al.

(10) Patent No.: US 10,600,590 B2
(45) Date of Patent: Mar. 24, 2020

(54) DEVICE, IN PARTICULAR A KEYBOARD, FOR DATA OR COMMAND ENTRY

(71) Applicant: QUBICAAMF EUROPE S.P.A., Bologna (IT)

(72) Inventors: Massimo Baraldi, Bologna (IT); Gian Luca Ferrari, Anzola dell'Emilia (IT); Ivano Noferini, San Lazzaro di Savena (IT); Vittorio Scagliarini, Sant'Agata Bolognese (IT); Roberto Vaioli, Ozzano dell'Emilia (IT)

(73) Assignee: QUBICAAMF EUROPE S.P.A., Bologna (IT)

( * ) Notice: Subject to any disclaimer, the term of this patent is extended or adjusted under 35 U.S.C. 154(b) by 80 days.

(21) Appl. No.: 14/548,515

(22) Filed: Nov. 20, 2014

(65) Prior Publication Data

US 2015/0077968 A1 Mar. 19, 2015

Related U.S. Application Data

(62) Division of application No. 13/529,600, filed on Jun. 21, 2012, now abandoned.

(51) Int. Cl.
*H01H 13/83* (2006.01)
*G06F 3/02* (2006.01)

(52) U.S. Cl.
CPC .......... *H01H 13/83* (2013.01); *G06F 3/0202* (2013.01); *G06F 3/0208* (2013.01); *G06F 3/0219* (2013.01); *G06F 3/0224* (2013.01)

(58) Field of Classification Search
CPC ...... F21Y 2111/001–007; F21Y 2113/00–007; F21S 8/033; F21V 33/00
See application file for complete search history.

(56) References Cited

U.S. PATENT DOCUMENTS

| 5,719,548 | A | * | 2/1998 | Stirling | A63D 5/04 340/323 B |
| 5,842,929 | A | * | 12/1998 | Moody | A63D 5/04 473/70 |
| D416,208 | S | * | 11/1999 | Arney | D10/46.1 |
| 6,270,421 | B1 | * | 8/2001 | Tsujita | A63D 5/04 473/54 |
| 7,611,417 | B2 | * | 11/2009 | Murrey | A63D 15/00 473/1 |
| 2001/0018882 | A1 | | 9/2001 | Recknagel et al. | |
| 2003/0109304 | A1 | * | 6/2003 | Gauselmann | G07F 17/3211 463/30 |
| 2004/0166932 | A1 | * | 8/2004 | Lam | G07F 17/3202 463/30 |

(Continued)

OTHER PUBLICATIONS

Office Action for related U.S. Appl. No. 13/529,600 dated Dec. 3, 2014, 12 pages.

(Continued)

*Primary Examiner* — Kenneth Bukowski
(74) *Attorney, Agent, or Firm* — Andrew M. Calderon; Roberts Calderon Safran & Cole, P.C.

(57) ABSTRACT

A device, in particular a keyboard, for data or command entry is disclosed. The device is suitable for entering data or commands into an electronic processing system, in particular, into an electronic system or apparatus for controlling a respective installation, such as an entertainment centre such as a bowling centre.

12 Claims, 10 Drawing Sheets

(56) References Cited

U.S. PATENT DOCUMENTS

| | | |
|---|---|---|
| 2005/0073446 A1 | 4/2005 | Lazaridis et al. |
| 2005/0078090 A1 | 4/2005 | Glatzer et al. |
| 2006/0063591 A1* | 3/2006 | Gauselmann ....... G07F 17/3211 463/30 |
| 2007/0019129 A1* | 1/2007 | Negley ............ G02F 1/133603 349/61 |
| 2007/0267497 A1 | 11/2007 | Tracy et al. |
| 2009/0243898 A1 | 10/2009 | Iorfida et al. |

OTHER PUBLICATIONS

Final Office Action for related U.S. Appl. No. 13/529,600 dated May 22, 2015, 14 pages.
Office Action dated Nov. 5, 2015 in related U.S. Appl. No. 13/529,600, 10 pages.
Final Office Action dated Mar. 15, 2016 in related U.S. Appl. No. 13/529,600, 11 pages.

* cited by examiner

DEVICE, IN PARTICULAR A KEYBOARD, FOR DATA OR COMMAND ENTRY

CROSS REFERENCE TO RELATED APPLICATIONS

The present application claims priority under 35 U.S.C. § 119 to Italian Utility Model Application No. BO2011U000039, filed on Jun. 24, 2011, the contents of which are incorporated by reference in its entirety herein.

FIELD OF THE INVENTION

This invention relates to a device, in particular a keyboard, for data or command entry. The device is suitable for entering data or commands into an electronic processing system, in particular, into an electronic system or apparatus for controlling a respective installation, preferably an entertainment centre such as a bowling centre.

BACKGROUND OF THE INVENTION

Known are keyboard devices for entering data or commands into an electronic processing system of a bowling centre. These keyboards comprise a plurality of keys to be typed, in particular in the form of keys distinguished by respective distinctive signs or symbols.

The keyboards normally used in bowling alleys have non-backlit keys which are difficult to see when the ambient lighting is dim, as is very often the case in bowling centres. It is also the practice in bowling alleys to have only one keyboard configuration both for a single lane and for a pair of lanes, in which case the keyboard can be used for one lane or the other, alternatively. To do this, the keyboards are provided with illuminated arrows and the respective circuitry, indicating the lane to the right or to the left the keyboard is being used for. When a keyboard is used for a single lane only, the arrow keys and the respective circuitry are removed and the resulting empty slots are sealed by plastic plugs. This mechanism(s) an added workload for keyboard manufacturers required to produce specific keyboard models for each specific use and necessitating additional warehouse space to store a suitable number of keyboards for each model. Moreover, in entertainment centres, especially bowling centres, the equipment used to interface with the processing system must be very easy to use so that the user's interaction with the system is as pleasant as possible.

According to another need, preference is also given to devices, or keyboards, comprising typing elements which give the user the feeling he/she is actually pressing a key. Otherwise, for example in entertainment centres, such as bowling centres, where the lighting is relatively dim, the user might not obtain the feel that the key has been pressed unless he/she does so while looking at the display which, in bowling centres, is usually located high up, well above users' heads, making the operation awkward and irritating.

SUMMARY OF THE INVENTION

It is therefore proposed a new solution to overcome one or more of the above mentioned drawbacks and/or problems and/or to meet one or more of the needs mentioned in or inferable from the above.

It is accordingly provided a device, in particular a keyboard, for entering data or commands into an electronic processing system, in particular, into an electronic system or apparatus for controlling a respective installation, preferably an entertainment centre such as a bowling centre. The device comprises one or more keys, at each of which there are provided respective identification signs. A mechanism is provided for emitting light radiation at the respective key, in particular to display the respective sign at the key. The mechanism for emitting the light radiation at the key can be selectively set to a state of emission corresponding to a respective operating or working condition of the respective key. That way, for example, the user can be prompted to follow a set of easy typing instructions, with obvious advantages in terms of typing convenience and speed.

BRIEF DESCRIPTION OF THE DRAWINGS

These and other innovative aspects are set out in the appended claims and the technical features and advantages of the invention are also apparent from the detailed description which follows of non-limiting example embodiments of it with reference to the accompanying drawings, in which:

DETAILED DESCRIPTION OF THE INVENTION

Figure 1:
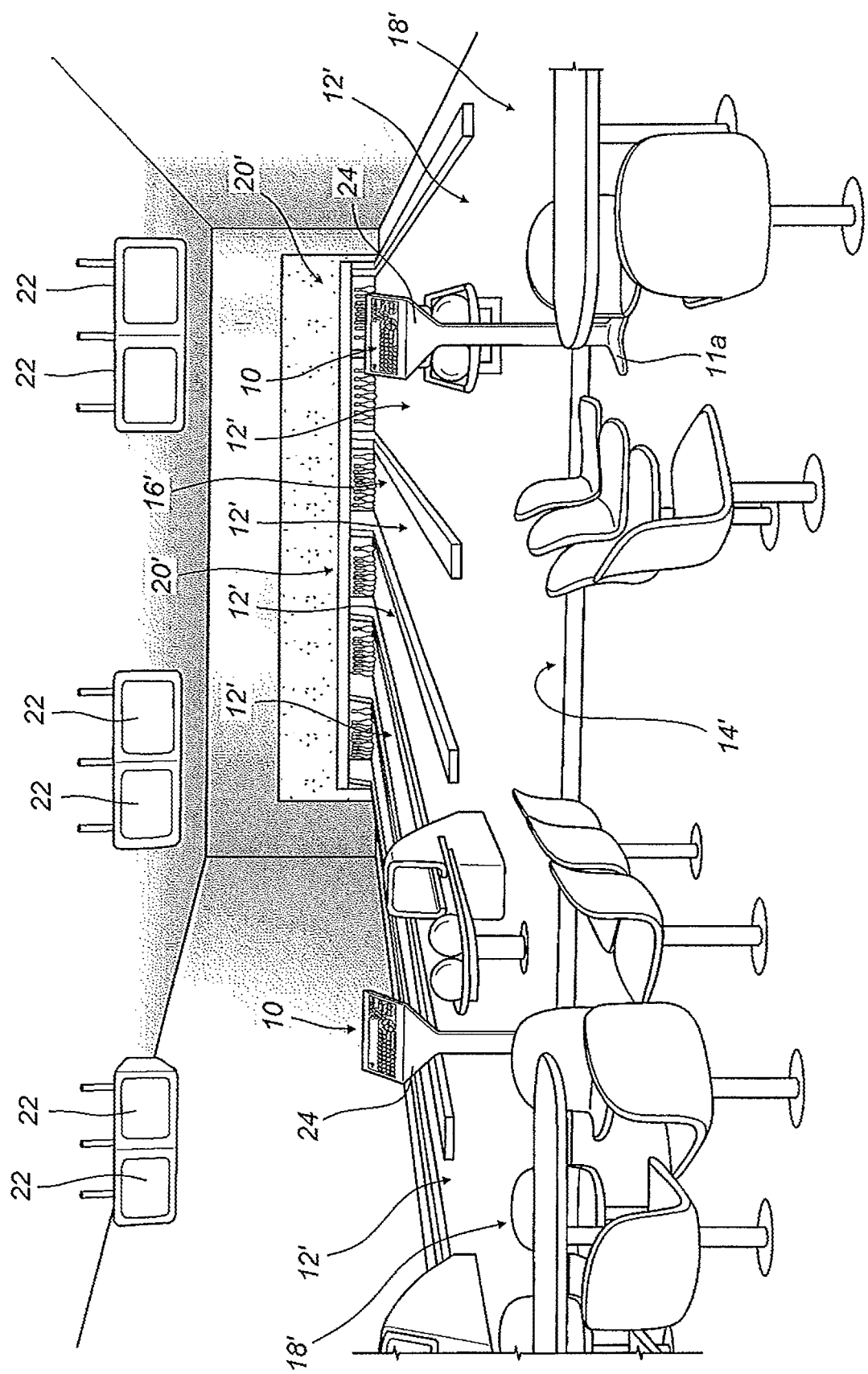
FIG. 1 is a schematic perspective view of a bowling centre in which a data or command entry device or keyboard according to this invention is used.
Figure 3:
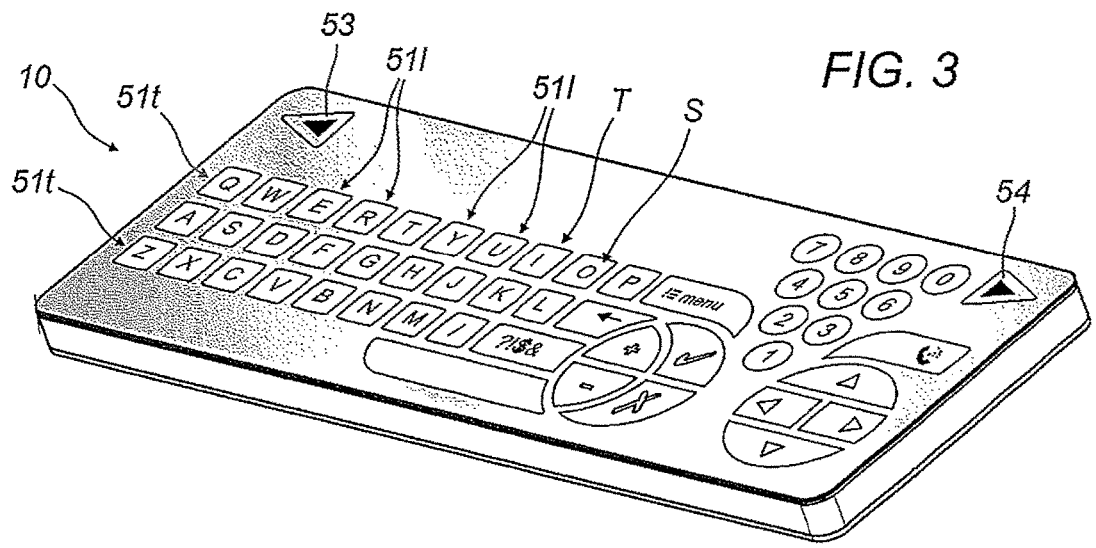
FIG. 3 is a schematic perspective view of an embodiment of the device or keyboard according to the invention.

In the accompanying drawings, FIGS. 1 and 3 show a first embodiment of the device, in particular a keyboard 10 for entering data or commands into an electronic processing system or apparatus, and consisting in particular of a system or apparatus for controlling a respective installation. The installation is preferably an entertainment centre, and more preferably a bowling centre.

As illustrated in FIG. 1, the bowling centre or alley comprises a plurality of lanes 12', having respective first and second ends 14', 16', and, for each lane, a players' point 18', which is located at an upstream end 14' of the lane 12', and a pin setting machine or pin spotter, 20', located at the downstream end 16' of the same lane 12'.

The installation is controlled by a corresponding electronic control apparatus or system which comprises display mechanism(s) at the respective lane, comprising a raised display or monitor 22, known as an "overhead monitor" to one of skill in the art, and associated with the SCORE or BOWLER TEAMING console, at the player point 24 where the entry device 10 is located. These lane monitors 22 are mainly and normally used to display the scoreboard. When other operations have to be carried out, however, the screens appearing on the monitors or displays 22 are used for direct interaction with the console keyboard 10, as will become clearer as this description continues. This entry device or keyboard is particularly suitable for use in the context of an entertainment centre, in particular a bowling centre, because it most greatly facilitates the user in performing specific tasks during a game, as will become clearer as this description continues.

In addition to the user command entry device 10, this apparatus may also comprise, at the "BOWLER TEAMING" player point 24, a joystick or any other device suitable for the purpose. The control system or apparatus also comprises general or central control or management mechanism(s), in the form of a main server. These general management mechanism(s) comprise at least a processor, or CPU, a respective memory and mechanism(s) for input/output of signals to and from local communication mechanism(s) such as a local area network, for example an Ethernet network.

The general management mechanism(s) may also comprise display mechanism(s), for example in the form of a respective display unit, at the central point or FRONT DESK of the bowling centre. The FRONT DESK is the conventional point at the player reception desk. The display mechanism(s) at the FRONT DESK may comprise, in particular, a corresponding display or monitor, and are not illustrated in detail in the accompanying drawings.

The general system management mechanism(s) may also comprise data entry mechanism(s), consisting of the entry mechanism(s) at the central point or FRONT DESK. These data entry mechanism(s) may comprise, for example, a keyboard or other input device, and are not illustrated in detail in the accompanying drawings. The present apparatus for managing the bowling centre also comprises respective local control or lane management mechanism(s), or possibly also mechanism(s) for managing a plurality of lanes, in particular a pair of lanes.

The local management or control mechanism(s) comprise a processor, usually referred to as the SCORE processor as known to one of ordinary skill in the art. In particular, the local management or control mechanism(s), or SCORE processor, comprise at least a CPU, a respective memory and mechanism(s) for input/output, in particular to/from the local area network, which in particular allows communication with the general management or control mechanism(s) of the bowling centre.

In addition, the local management or control mechanism(s) comprise special input/output mechanism(s) for connection to the display mechanism(s) or monitors 22 at the player point, and to the pin setter, or to mechanism(s) for interfacing with the pin setter. The general control mechanism(s) and local or lane control mechanism(s) comprise a respective program having a plurality of routines, with respective instructions, suitable for defining corresponding management or control functions. In particular, in bowling centres, the lane management mechanism(s) can detect when certain events occur partly thanks to the presence of suitable sensors, or similar mechanism(s), located at the respective lane and/or at the pin setter, for example a camera for scanning the pins in order to calculate the score.

More specifically, the signal management apparatus comprises a program, in particular a program residing in the lane control mechanism(s), for managing the score and having respective mechanism(s), in the form of routines or instructions which detect game-related actions for each specific player, such as for example, a throw resulting in a number of pins being bowled down and convert each action into a corresponding game event, determining for example the type of event, be it a strike or other result and calculating its score and the total game score.

The program of the apparatus according to the invention also comprises mechanism(s) in the form of routines or instructions for displaying the score on respective display mechanism(s), typically display mechanism(s) at the lane 22, as mentioned above.

As indicated, communication between the diverse units of the bowling centre is preferably provided via an Ethernet network. However, it shall be understood that other mechanism(s) of communication could also be used, such as an optical fibre network or communication via Hertz waves or other mechanism(s). The device 10 of the invention can advantageously be used in these bowling centres, in particular at the player point, as described above.

As may be seen from FIGS. 3 to 5, the typing device 10, or keyboard, of the invention comprises one or more engagement elements, in particular a plurality of typing elements, which are, in particular, in the form of respective keys "T", described in more detail below and distinguished by respective identification signs defining corresponding characters or symbols. As illustrated, the signs are especially in the form of respective alphanumeric characters, punctuation marks or arithmetic signs, control signs and the like.

Advantageously, lighting mechanism(s) are provided for illuminating the respective symbols S at the typing elements or zones T. These lighting mechanism(s), which are described in more detail below, are designed to illuminate the respective keys so that the symbols or signs can be effectively displayed, in particular by illuminating the keys selectively and independently of each other.

Figure 5:
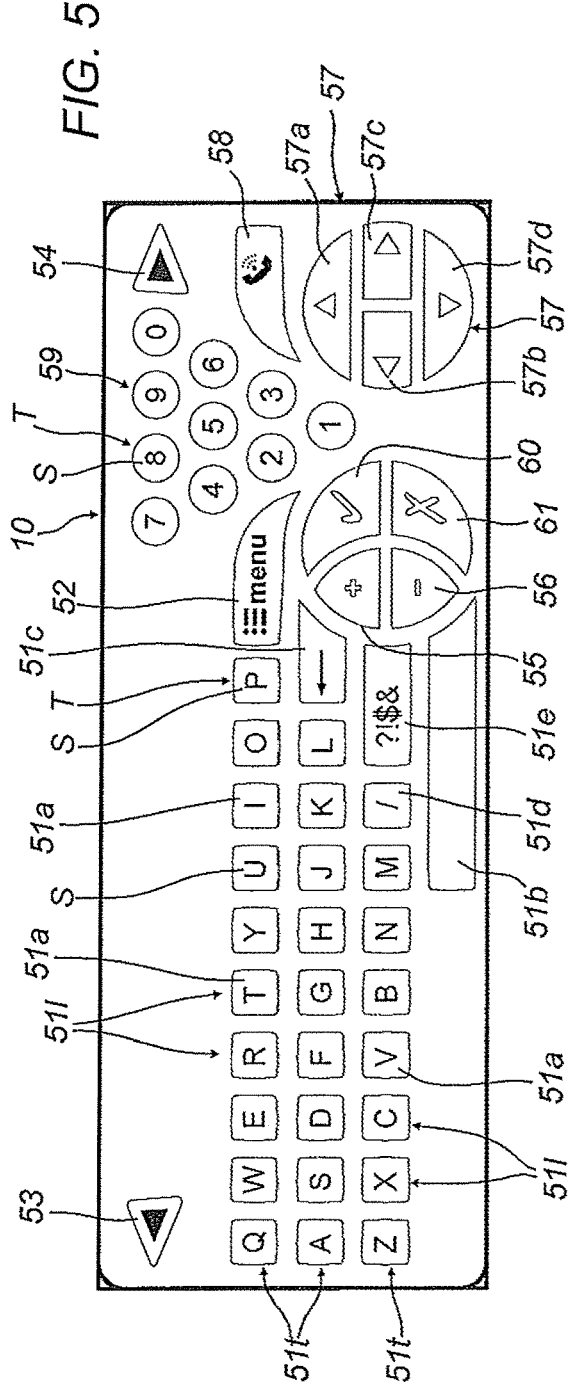
FIG. 5 is a top plan view of this first embodiment of the device or keyboard.

More in detail, as may be seen from FIG. 5, the device or keyboard comprises a plurality of keys or typing zones 51 which are suitable for making up alphanumeric compositions and which are located in a respective area of the device or of its front surface. More specifically, as illustrated, the keys which are suitable for making up alphanumeric compositions are arranged in respective longitudinal and transversal rows, labelled 51*l* and 51*t*, respectively, in FIG. 5. More specifically, the keys which are suitable for making up alphanumeric compositions comprise a plurality of elements or keys 51*a* for the letters of the alphabet, in particular, the letters of the English alphabet from A to Z, a transversely elongate element or key 51*b* defining a space bar, an element or key 51*c* corresponding to the delete or backspace command, an element or key 51*d*, corresponding to the command for entering the slash character, an element or key 51*e* bearing a plurality of symbols such as the question mark, the exclamation mark, a currency symbol, in particular the dollar symbol, and the ampersand symbol. Further, the device or keyboard of the invention comprises a key or typing zone 52 for activating a menu for the management of typing operations.

As illustrated, the device further comprises a first and a second key or typing zone, labelled 53 and 54, respectively, which are used to select a first lane, for example a right-hand lane, or a second lane, for example a left-hand lane, of the player point the typing device is associated with. Obviously, it will be understood that the first and second typing elements 53 and 54 would not be lit and, hence, would not be highlighted, if this keyboard were used in a bowling centre where one keyboard or typing device is associated with each single lane. The first and second keys 53 and 54 would, instead, be activated if the keyboard were used in a bowling centre where a single data entry keyboard serves a pair of lanes placed side by side, and in any case only if it is necessary to select the right- or left-hand lane, or in the event of a fault in the data entry mechanism(s) of a nearby lane. In the latter case, a lane can advantageously remain open and in operation even if the respective keyboard is faulty.

The device also comprises at least one typing element or key, in particular a first and a second element 55 and 56, used for performing a respective arithmetic operation or to type a corresponding arithmetic symbol, such as, in this case, a plus (+) sign and a minus (−) sign. In the first preferred embodiment of the device, the typing keys 55, 56 are longitudinally aligned with each other alongside the alphabetic key zone 51. The typing keys 55, 56 are also longitudinally aligned with, or under, the menu activation key 52. In the first preferred embodiment of the device, as illustrated, the typing elements, labelled 53 and 54, relating to the arrows for selecting a right-hand lane and a left-hand line are located at the top of the keyboard, at transversely opposite or lateral edges.

The device also comprises a plurality of typing elements or keys 57 defining arrow keys, in particular for moving the cursor or mobile indicator appearing on the corresponding display. The arrow keys are labelled 57a, 57b, 57c, 57d and, in the preferred embodiment, are located in a zone which is transversely aligned with the alphanumeric entry elements 51, in particular at a lateral end of the device or keyboard.

The device also comprises an element or key for typing a command for activating a communication, in particular an interphone communication, especially a communication addressed to a service within the bowling centre, such as a bar or other service. In the first preferred embodiment, the interphone key, labelled 58, is longitudinally aligned above the arrow key area 57.

The device also comprises a plurality of typing elements or keys defining a numeric keypad and/or a configuration corresponding to that of the bowling pins in the lane, according to the traditional bowling pin layout. The typing keys defining a keypad or the bowling pin layout in the lane are located in a triangular zone 59 interposed between the numeric keys, the menu key, the interphone key 58, and the arrow keys 57.

As illustrated, there are 10 keys 59, numbered from 0 to 9, the 1 key being located at the lower vertex of the triangle and the 7, 8, 9 and 0 keys being located along the longitudinal end row of the triangle 59 opposite the vertex. The intermediate rows of keys 59 of the numeric keypad bear the numbers 2 and 3 and from 4 to 6, respectively. In practice, the numeric keypad reproduces the bowling pin layout and numbering, the number ten pin being represented by the zero key.

The device also comprises a first and a second typing key, labelled 60 and 61 respectively, corresponding to commands for managing the menus which appear on the display corresponding to the typing device. More specifically, a respective symbol 60 identifies an escape key for exiting the respective menu, whilst a respective symbol 61 identifies a confirm or enter key with which, for example, a respective menu option can be confirmed or a typing sequence terminated, as will become clearer as this description continues.

A different, particularly attractive and convenient arrangement of the keys 51, 52, 53, 54, 55, 56, 57, 58, 59, 60 and 61, described above, is shown in FIG. 6, which represents a second preferred embodiment of the device or keyboard.

Advantageously, this device comprises mechanism(s) for emitting the light radiation for displaying the respective key, these mechanism(s) being electronically controlled by respective control mechanism(s), which may be the central control mechanism(s) of the bowling centre, the lane control mechanism(s) or other control mechanism(s)) and which, based on a respective control program, cause the mechanism(s) for emitting the light radiation at the key to be selectively set to a corresponding emitting state corresponding to an operating or working condition of the key.

More specifically, the mechanism(s) for emitting the light radiation at the key can be selectively set to a first and a second emitting state corresponding to a respective first and second operating or working condition of the respective key. Also, advantageously, the mechanism(s) for emitting the light radiation at the key can be selectively set to a third emitting state corresponding to a respective third operating or working condition of the respective key, as will become clearer as this description continues. Also, advantageously, the mechanism(s) for emitting the light radiation at the key can be selectively set to a fourth emitting state corresponding to a respective fourth operating or working condition of the respective key, as will become clearer as this description continues.

More specifically, one emitting state of the emitting mechanism(s) advantageously corresponds to a condition where the key is in typing mode or enabled for typing. Also, one emitting state of the emitting mechanism(s) advantageously corresponds to a condition where the key is in non-typing mode or disabled for typing.

More specifically, advantageously, the mechanism(s) for emitting the light radiation at the key can be selectively set to a first and a second emitting state corresponding respectively to an operating condition where the key is in typing mode and to an operating condition where the key is in non-typing mode.

Thus, the keyboard prompts the user to press only the keys which are suitable for a specific operation. This keyboard is therefore particularly advantageous in those contexts, such as the bowling centre, where the display monitor is far from the keyboard and would oblige the user to constantly look back and forth between the display and the keyboard in order to see what he or she is typing.

Another emitting state of the light emitting mechanism(s) corresponds to a condition where the key has just been typed or to a condition where the key is engaged by the user's finger. Advantageously, therefore, the mechanism(s) for emitting the light radiation at the key can be selectively set to a third emitting state corresponding to a respective operating condition where the key has just been typed.

Further, the emitting state of the light emitting mechanism(s) might also correspond to a condition where the key is totally unavailable for typing, that is to say, the key is totally disabled for command entry. Advantageously, the mechanism(s) for emitting the light radiation at the key can be selectively set to a fourth emitting state corresponding to a respective operating condition where the key is totally unavailable for typing.

Thus, a single keyboard can be provided for a plurality of uses in respective bowling centres, for example, also in bowling centres where a particular function cannot be activated and is therefore totally omitted during use. For example, where there is no interphone service, the respective key is not activated and is not visible on the keyboard.

Advantageously, the respective emitting state might correspond to a respective brightness level of the light emitting mechanism(s). This preference must not be considered as limiting the invention. In a different embodiment, the respective emitting state might correspond to a different colour of the light signal emitted. More specifically, the respective emitting state might correspond to a high brightness level. Further, the respective emitting state might correspond to a brightness level that is dimmer than a high brightness level, or the respective emitting state might correspond to a low brightness level.

Thus, the mechanism(s) for emitting the light radiation at the key can be selectively set to a corresponding first emitting state, corresponding to a high brightness level, and to a second emitting state, corresponding to a brightness level that is dimmer than a high brightness level or to a low brightness level. The first state, corresponding to a high brightness level, corresponds to an operating condition where the key is in typing mode or enabled for typing, and the second state, corresponding to a brightness level that is dimmer than a high brightness level or to a low brightness level, defines an operating condition where the key is in non-typing mode or disabled for typing.

The respective emitting state might correspond to a condition where light emission is off or not visible by the user. More specifically, the mechanism(s) for emitting the light radiation at the key can be selectively set to a third emitting state corresponding to a condition where light emission is off or not visible by the user and corresponding to a respective operating condition where the key has just been typed. The condition where light emission is off lasts for a predetermined length of time, in particular for a few seconds, or for as long as the user's finger remains in contact with the key.

Further, the mechanism(s) for emitting the light radiation at the key can be selectively set to a fourth emitting state corresponding to a condition where light emission is off or not visible by the user and corresponding to a respective operating condition where the key is disabled for typing. The condition where light emission is off is maintained permanently on the keyboard installed in the respective bowling centre.

In practice, advantageously, to perform a certain operation or activity, the device can be configured in a respective operating state where one or more keys are in typing mode and one or more keys are in non-typing mode and/or in a condition where the key is disabled for typing.

In practice, advantageously, the device can be configured in a preset operating state where one or more keys are in typing mode and one or more keys are in non-typing mode, depending on, or according to, the specific operation which must be carried out and which is shown on the corresponding display.

In practice, the device has a group of keys, comprising one or more keys, which is in key typing mode, and a second group of keys, comprising one or more keys, which is in key non-typing mode, depending on the specific operation to be implemented by the device.

Advantageously, the device has a plurality of operating states, in each of which one group of keys (comprising one or more keys) is in typing mode, and a second group of keys (comprising one or more keys) is in non-typing mode.

In practice, the keys which are in typing mode and in non-typing mode change according to the operation or activity to be performed and shown on a corresponding screen of the respective display 22.

Advantageously, the device has a sequence of operating states suitable for performing a single operation or activity, there being in each of the operating states one group of keys, comprising one or more keys, which is in key typing mode, and a second group of keys, comprising one or more keys, which is in key non-typing mode. In practice, the keys which are in typing and non-typing mode change in sequence to be able to perform successive steps of an operation or activity and which are shown in a sequence of corresponding screens of the display 22. More specifically, advantageously, the respective operating state of the device corresponds to an operation to be performed in a bowling centre and, preferably, to an operation to be performed in connection with a game of bowling. More specifically, the respective operating state of the device corresponds to an operation to be performed during a game of bowling.

Moreover, as will become clearer as this description continues, the respective operating state of the device may also correspond to an operation by which a menu is opened to provide a plurality of options. Further, as will become clearer as this description continues, the respective operating state of the device may correspond to an operation of choosing from a plurality of options. Further, as will become clearer as this description continues, the respective operating state of the device may correspond to an operation of typing in the data relating to a player and/or a team, such as the name of the player and/or of the team. Further, as will become clearer as this description continues, the respective operating state of the device may correspond to an operation of modifying the game score and including, in particular, selecting the bowling throw, typing in the correct score for the specific bowling throw, removing the throw from the score and/or making the camera scan the pins again.

According to another viewpoint, this device or keyboard thus comprises a plurality of keys and can be selectively set to a condition whereby the device is enabled to perform a certain operation, where the keys are selectively in a condition of key typing mode or enabled for typing, in an operating condition where the keys are in non-typing mode or disabled for typing, and/or in an operating condition where the keys are totally unavailable for typing. More specifically, as will become clearer as this description continues, this device comprises a first group of keys, comprising one or more keys, where the light emitting condition of the keys is high, and a second group of keys, comprising one or more keys, where the light emitting condition of the keys is dimmer or where the light emitting condition of the keys is low.

This device also has a third group of keys, comprising one or more keys, where the light emitting condition of the keys is such that the keys are off or blacked out from the user's view. This situation occurs in particular when the keyboard is used in entertainment centres, preferably bowling centres, where a certain function is not implemented, for example when a particular facility, such as calling the bar service through the interphone, is not available. In such a case, the interphone key remains completely blacked out. Another situation where a key might remain blacked out is when the keyboard is used for a single bowling lane. In such a case, the lane selection keys 53 and 54 remain completely blacked out. Another situation where keys might remain blacked out, for example the lane selection keys, is when the lane is selected once for all at the beginning of a game or when the lane is opened.

Advantageously, if the device is out of order or does not need to be used, the device can be set to a device disabled condition where the light emitting state of each key of the plurality of keys is off. In such a case, in addition to the advantage in terms of energy saving, users have an immediate visual indication that a lane is not occupied or in operation.

In practice, advantageously, according to a preferred operating procedure, the device can be set to a lane open operating condition, where a first group of keys, in particular one key, or a first and a second key for lane selection, is in an operating condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level.

More specifically, according to a preferred operating procedure, the device can be set to an operating condition, where a first group of keys, in particular, the menu key 52, is in an operating condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level.

Figure 11A:
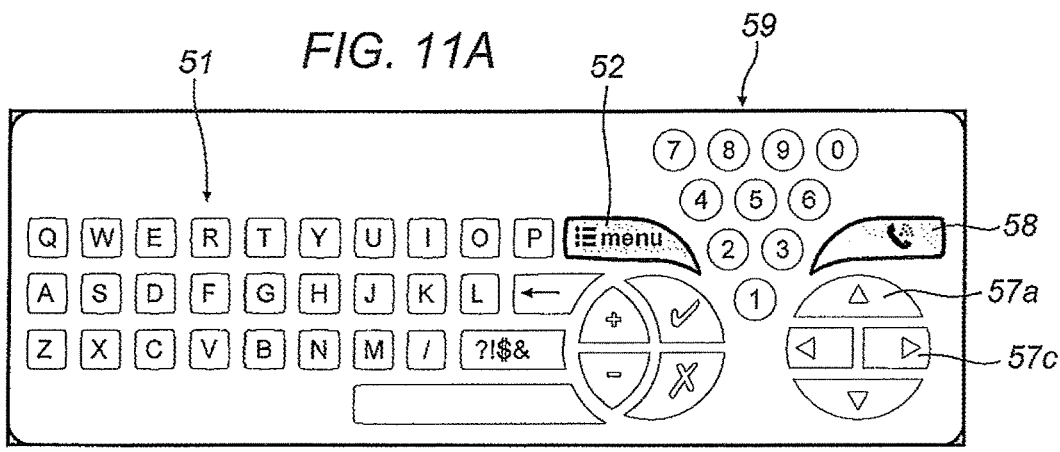
FIGS. 11A to 16B illustrate respective configurations or states of illumination of the device or keyboard, corresponding screens displayed on the corresponding overhead monitor where the keys that can be typed appear in bold, with a thicker profile, and on a darker background.
Figure 11B:
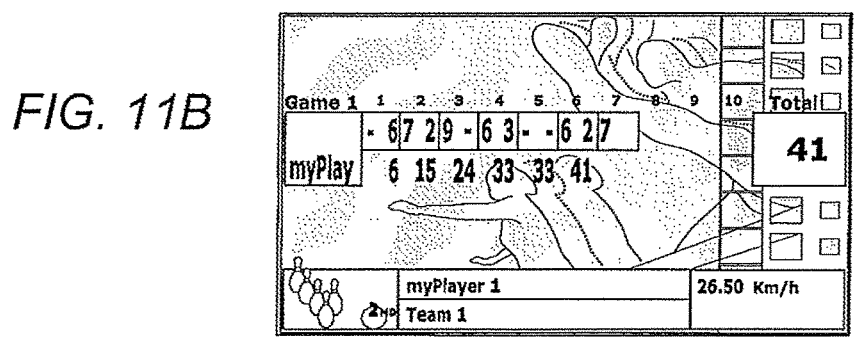

Advantageously, the preferred operating procedure just described, where only the menu key is active, is illustrated in FIG. 11A, and is implemented preferably in a condition of game in progress, with the corresponding display or screen showing the normal score, as illustrated in FIG. 11B. In this condition, as illustrated in FIG. 11A, the interphone or service call key might also be active. This preferred operating procedure, where only the menu key 52 is active, might also be implemented advantageously at the start of a game, so that the names of the players and of the teams the players belong to can be entered immediately.

Whatever the case, according to a further operating procedure, when the menu key 52 is pressed, the device can be set to a condition where a menu provides a plurality of options to choose from, in particular, where the user can choose to type in the names of the players, type in the name of the team, modify the score or stop the current game, and where a first group of keys, comprising in particular the menu key, some numeric keys, the enter key 60 and the escape key 61, and possibly also the interphone key, is in a condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level.

Figure 12A:
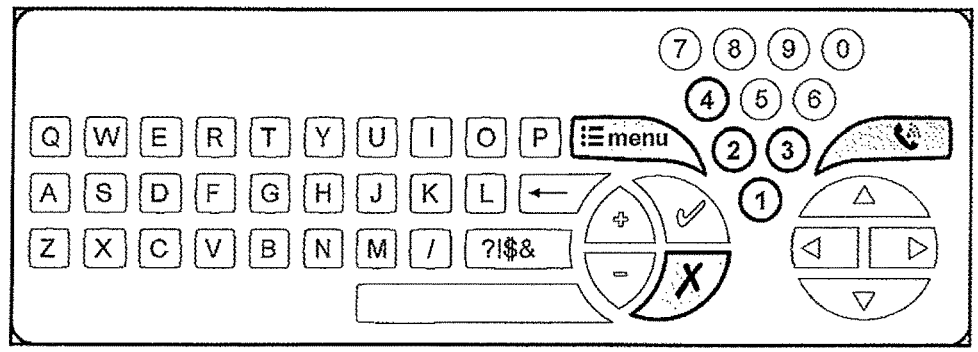
Figure 12B:
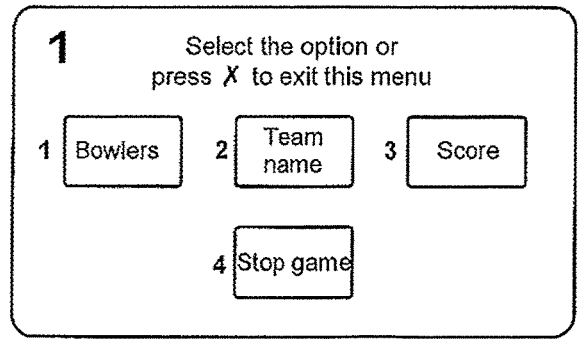

The above situation is illustrated in FIG. 12A and corresponds to a screen shown on the corresponding display or monitor illustrated in FIG. 12B. More specifically, as may be seen from the screen illustrated in FIG. 12B, pressing one of the numeric values or symbols from 1 to 4 activates one of the options of typing in the player names, typing in the team name, modifying the score or stopping the current game.

In practice, therefore, when the menu key 52 is pressed, the display mechanism(s) 22 show the screen of FIG. 12B and the keyboard is set to the condition illustrated in FIG. 12A. For example, when the option selected by pressing the corresponding numeric key, in particular by pressing the 1 numeric key, the user chooses to enter player data, according to a further operating procedure, where the device is set to a condition where a plurality of data entry options is provided and where a first group of keys, in particular comprising the menu key 52, the exit or escape key 61, the numeric keys, in particular from 1 to 7, and possibly also the interphone key, is in a condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level.

Figure 13A:
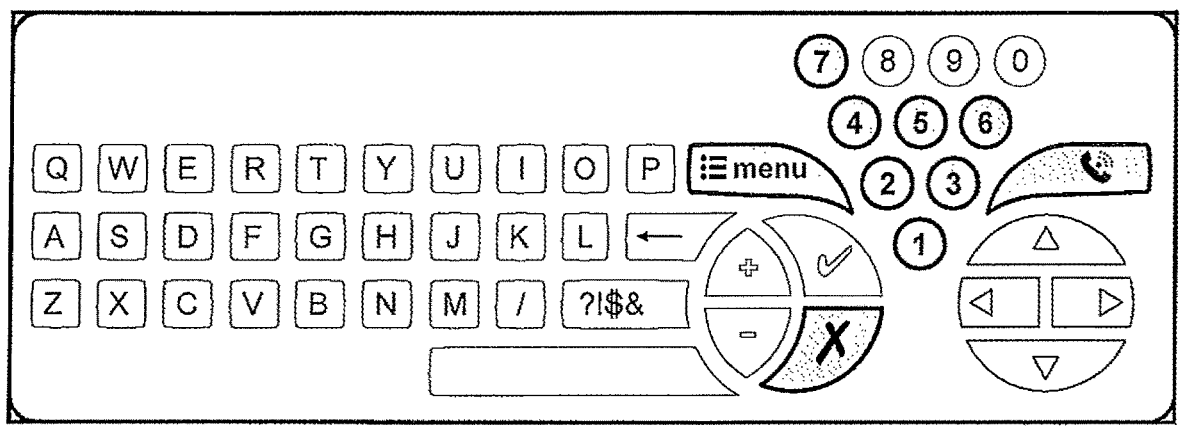
Figure 13B:
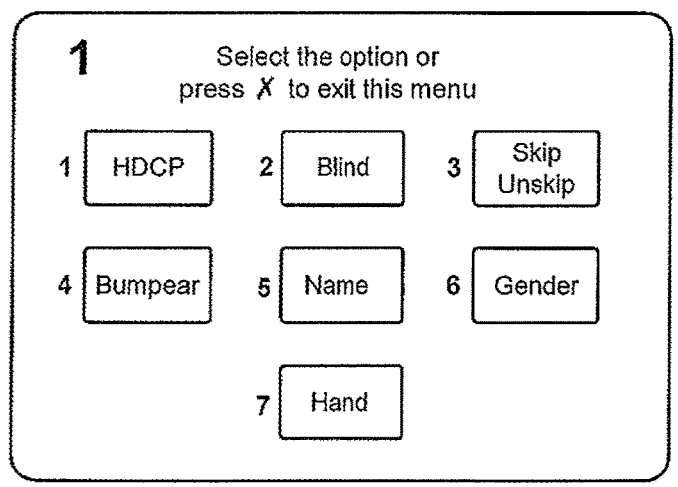

The above situation is illustrated in FIG. 13A and corresponds to a screen shown on the corresponding display or monitor illustrated in FIG. 13B. For example, when the option selected by pressing the corresponding numeric key, in particular by pressing the 5 numeric key, the user chooses to enter the player's name, according to a further operating procedure, where the device is set to a condition for entering the name and where a first group of keys, in particular comprising the menu key 52, the confirm or enter key 60, the exit or escape key 61, the alphabetic keys 51, the numeric keys 59, the plus (+) key 55 and the minus (−) key 56, and possibly also the interphone key, is in a condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level.

Figure 14A:
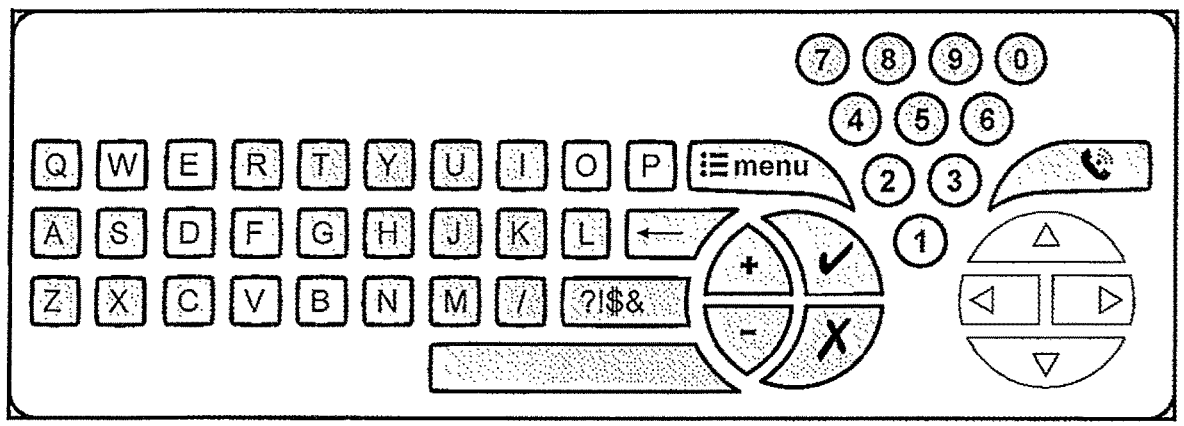
Figure 14B:
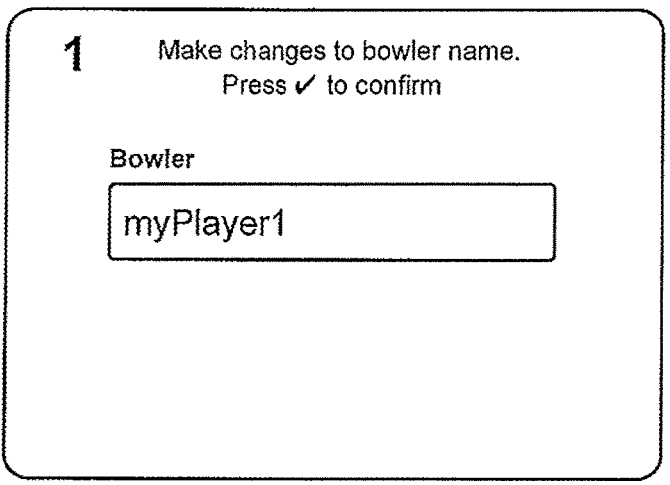
Figure 14C:
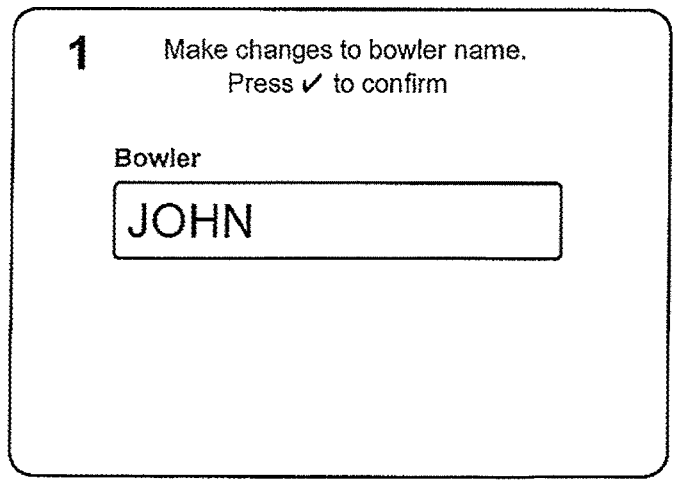

The above situation is illustrated in FIG. 14A and corresponds to a screen shown on the corresponding display or monitor illustrated in FIG. 14B. Under these conditions, typing in the player's name, for example "John", causes the screen illustrated in FIG. 14C to be displayed.

Otherwise, after pressing only the menu key 52 with the display 22 showing the screen of FIG. 11B so that the keyboard is set to the condition shown in FIG. 11A, if the user, by pressing the corresponding numeric key, chooses the option to modify the game score, the device is set, according to a further operating procedure, to a condition for selecting the throw to be modified where a first group of keys, in particular comprising the menu key 52, the arrow keys 57, the confirm or enter key 60, the escape key 61 and possibly also the interphone key, is in a condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level.

Figure 15A:
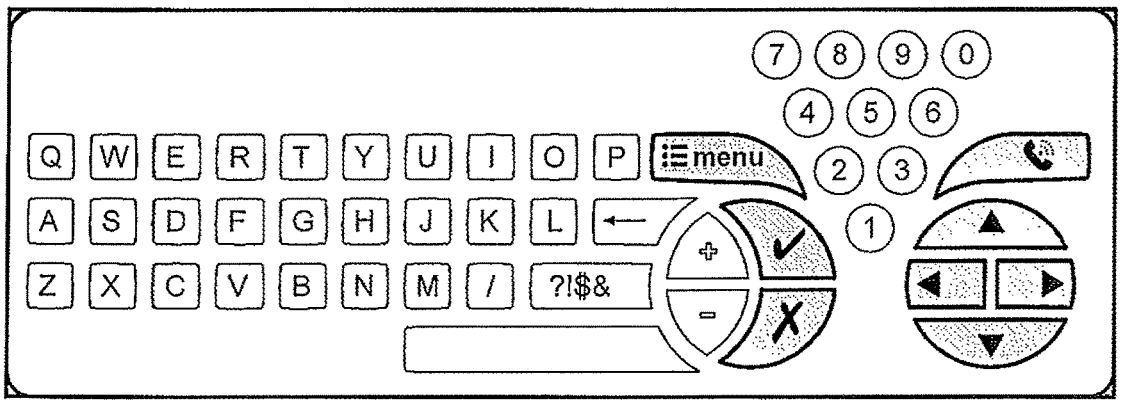
Figure 15B:
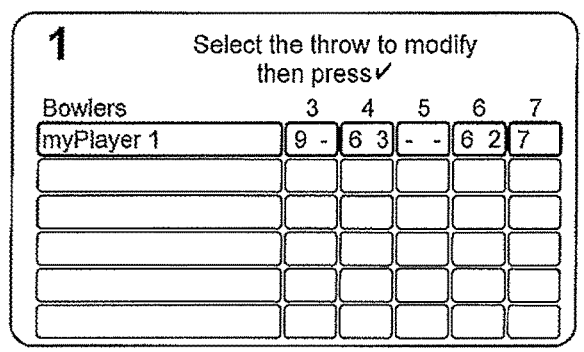
Figure 16A:
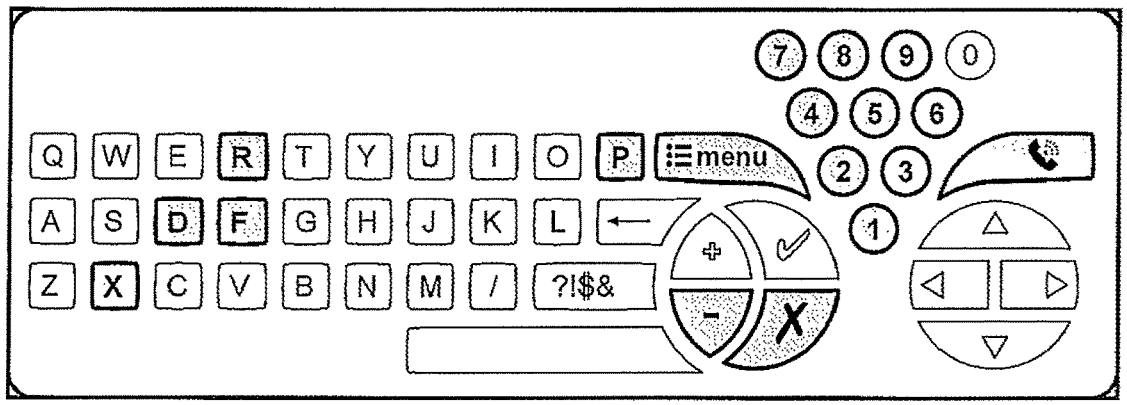
Figure 16B:
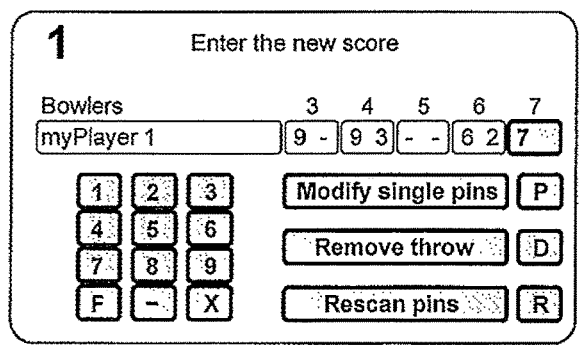

This situation is illustrated in FIG. 15A and corresponds to a screen shown on the corresponding display or monitor illustrated in FIG. 15B. This situation occurs when the user chooses the option to correct the score by pressing the 3 numeric key from the menu illustrated in FIG. 12B. More specifically, after selecting the throw to be modified using the screen shown in FIG. 15B and the keyboard of FIG. 15A, in a preferred operating procedure, the device is set to a condition for modifying the score (for example, modifying a single pin, removing the score of a bowling throw, making the camera scan the pins again) where a first group of keys, comprising the menu key, the numeric keys, one or more alphabetic keys, the confirm or enter key, the escape key, the minus (−) and possibly also the interphone key, is in an operating condition of key typing mode or enabled for typing, preferably with light emission set to a high brightness level, and a second group of keys, in particular all the other keys of the device, is in an operating condition of key non-typing mode or disabled for typing, preferably with light emission set to a brightness level which is dimmer than a high brightness level or to a low brightness level. This situation is illustrated in FIG. 16A and corresponds to a screen shown on the corresponding display or monitor illustrated in FIG. 16B.

After doing these operations, pressing the menu key causes the system to return to normal playing conditions, resetting the keyboard to the configuration shown in FIG. 11A and the display 22 to the screen shown in FIG. 11B.

As illustrated in FIGS. 11A to 16A, the device or keyboard also has a third group of keys (the lane selection arrow keys 53, 54) which are in a condition of unavailability for use, or blacked out, with the light emitting mechanism(s) off.

In practice, thanks to this keyboard, only the keys needed for a specific operation are well lit and in view, depending on what that operation is. Thus, the user is prompted to type only the keyboard elements useful for the operation to be carried out at that particular moment, thereby making it quicker and easier for the user to perform the operation.

Figure 2:
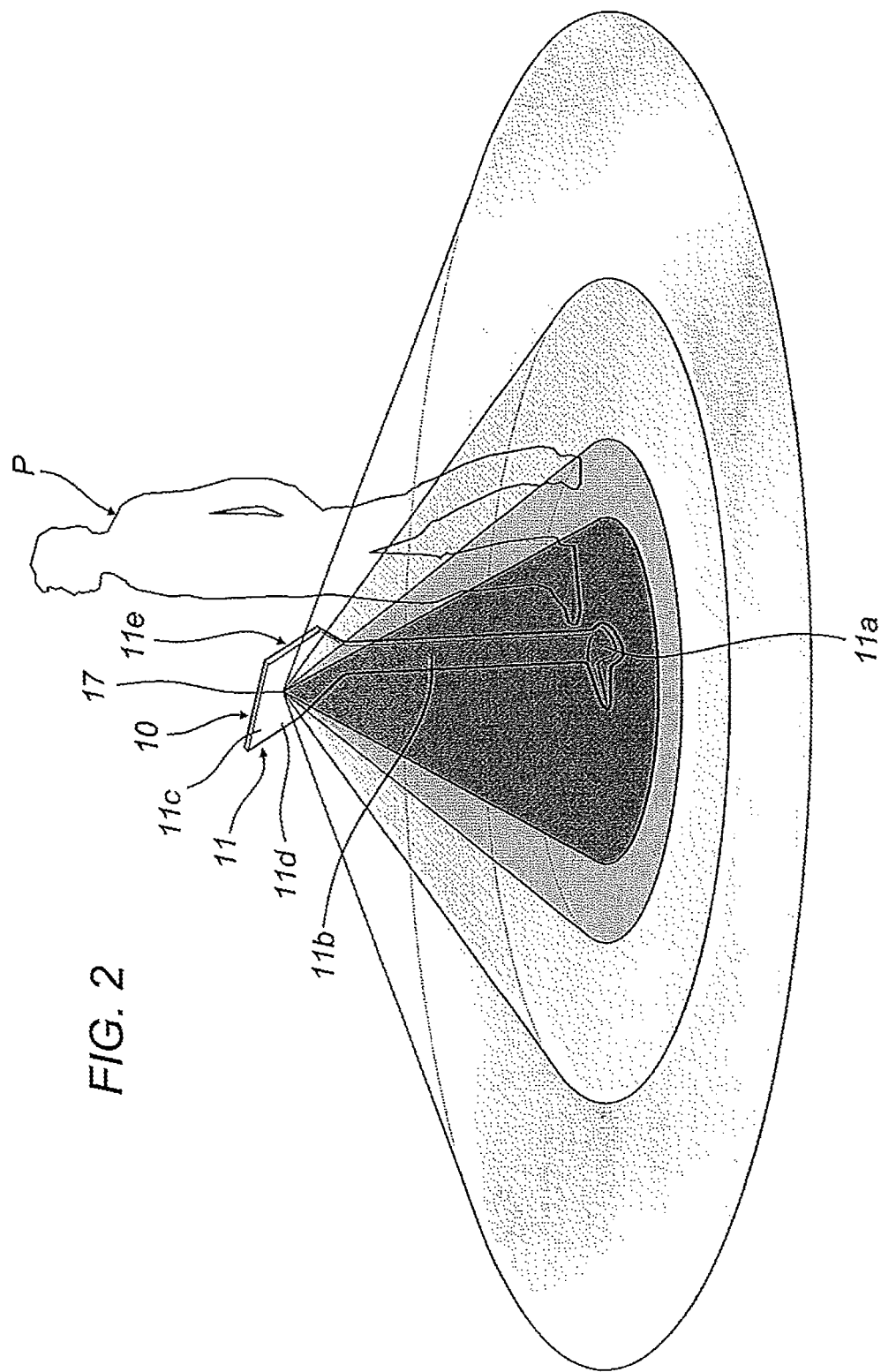
FIG. 2 is a schematic perspective view of a backlit stand for this device.

For example, in the case of a bowling centre like the one illustrated, the player P, as shown in FIG. 2, stands at the keyboard 10, which is mounted on a stand 11 in a bowling alley environment that is normally dimly lit, and can easily type only the well-lit keys necessary to perform the specific operation required by the control system of the bowling centre at any particular moment.

Moreover, it is thus advantageously possible to assign the same keyboard to different uses by simply not switching on the parts of the keyboard that are not needed for a specific use it has been assigned to at a particular time. For example, it is not necessary to switch on the right- or left-hand lane selection arrow keys if the keyboard is currently assigned to a single lane in the bowling centre.

Figure 4:
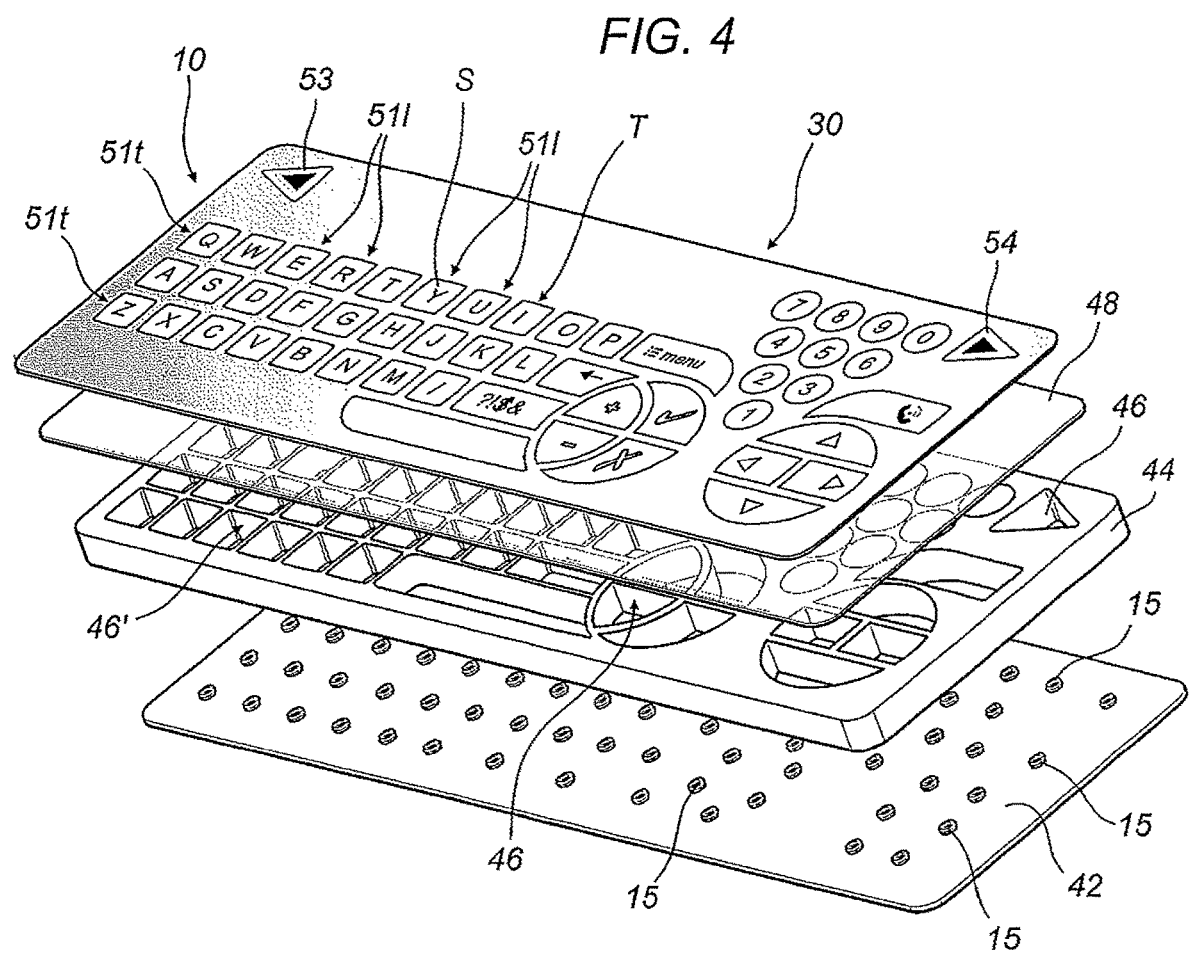
FIG. 4 is an exploded view of a first embodiment of the device or keyboard.

As may be seen in particular from FIG. 4, the lighting mechanism(s) for illuminating the respective symbols comprise a plurality of lighting elements, each denoted by the reference numeral 15 and being designed to illuminate a respective symbol S at a respective typing zone or element T. More specifically, the lighting mechanism(s) for illuminating the respective symbol are in the form of mechanism(s) for emitting light radiation. More specifically, each lighting element is on the form of a respective LED 15. As illustrated in FIG. 4, there are a plurality of LEDs 15 mounted on a card or board 42. Each LED or lighting element may be monochrome, emitting white light for example, or coloured, such as red green blue (RGB) LEDs, for example.

Advantageously, each symbol is selectively illuminated according to the activity being performed in the installation, in particular, in the entertainment or bowling centre, and more specifically, the illumination depends on the activity to be performed by the user of the entry device, in particular the player P. More specifically, the activity which the player P can perform is in any case a game-related activity at a respective bowling lane or other activity intended for the refreshment of the player, such as, for example, the possibility of calling the bar or other service.

Advantageously, the selective illumination of the typing device or keyboard is controlled by respective control mechanism(s), in particular, the general control mechanism(s), especially the general control mechanism(s) of the entertainment or bowling centre or by the local or lane control mechanism(s). More specifically, the selective illumination of the typing device or keyboard is controlled automatically by the electronic control mechanism(s) according to the particular operation that the user must or may perform. More specifically, the electronic control mechanism(s) selectively switch the lighting mechanism(s) on and off.

More specifically, therefore, the control mechanism(s) are designed to switch the illumination of each symbol on or off selectively at a respective typing zone or element, in particular by switching the corresponding light emitters or LEDs 15 on at a predetermined brightness level or off. More specifically, the control mechanism(s) illuminate, or accordingly control the illumination of, the respective keyboard symbols in response to a preceding game event. More specifically, the lighting mechanism(s) for illuminating the symbols at the respective typing zones or elements illuminate these symbols at different light intensities. More specifically, the lighting mechanism(s) for illuminating the symbols at the respective typing zones or elements illuminate these symbols at a high light intensity or at a low light intensity which is barely perceptible by the user. Obviously, the high light intensity is clearly and easily perceptible by the user.

An example of this is shown in FIGS. 11A to 16A, where the brightness of the illumination is high for the symbols S of only some of the keys, whilst the brightness of the illumination of the keys that must not be typed is low or dimmed and these keys are barely visible.

Obviously, when the backlighting is switched off completely, none of the keys on the keyboard 10 is visible.

As shown in FIG. 4, the keyboard comprises, in particular, a top part 30 defining the typing elements T. More specifically, the typing keys or elements T are of a kind which is elastically compliant under the action of the pressure exerted by the user's finger, this elastic compliance being provided, in particular, by at least one corresponding two-dimensional layer which is elastically compliant under the action of pressure applied perpendicularly to the layer.

More specifically, by pressing a key with a finger, the user applies a pressure perpendicular to the surface of the key, causing the key to give slightly by elastic action, in such a way as to close a corresponding electric contact by which the data or command is entered. When the pressure of the user's finger is removed, the layer defining the key returns elastically to its position prior to being typed, thereby opening or breaking the respective electrical contact.

Figure 7:
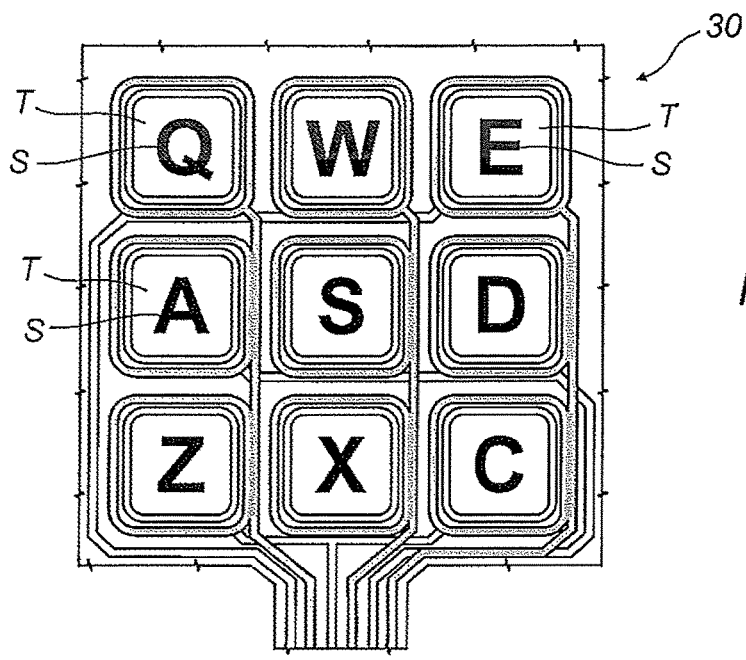
FIGS. 7 and 8 are a plan view and an exploded view of a detail of the top of the first embodiment of the device or keyboard.
Figure 8:
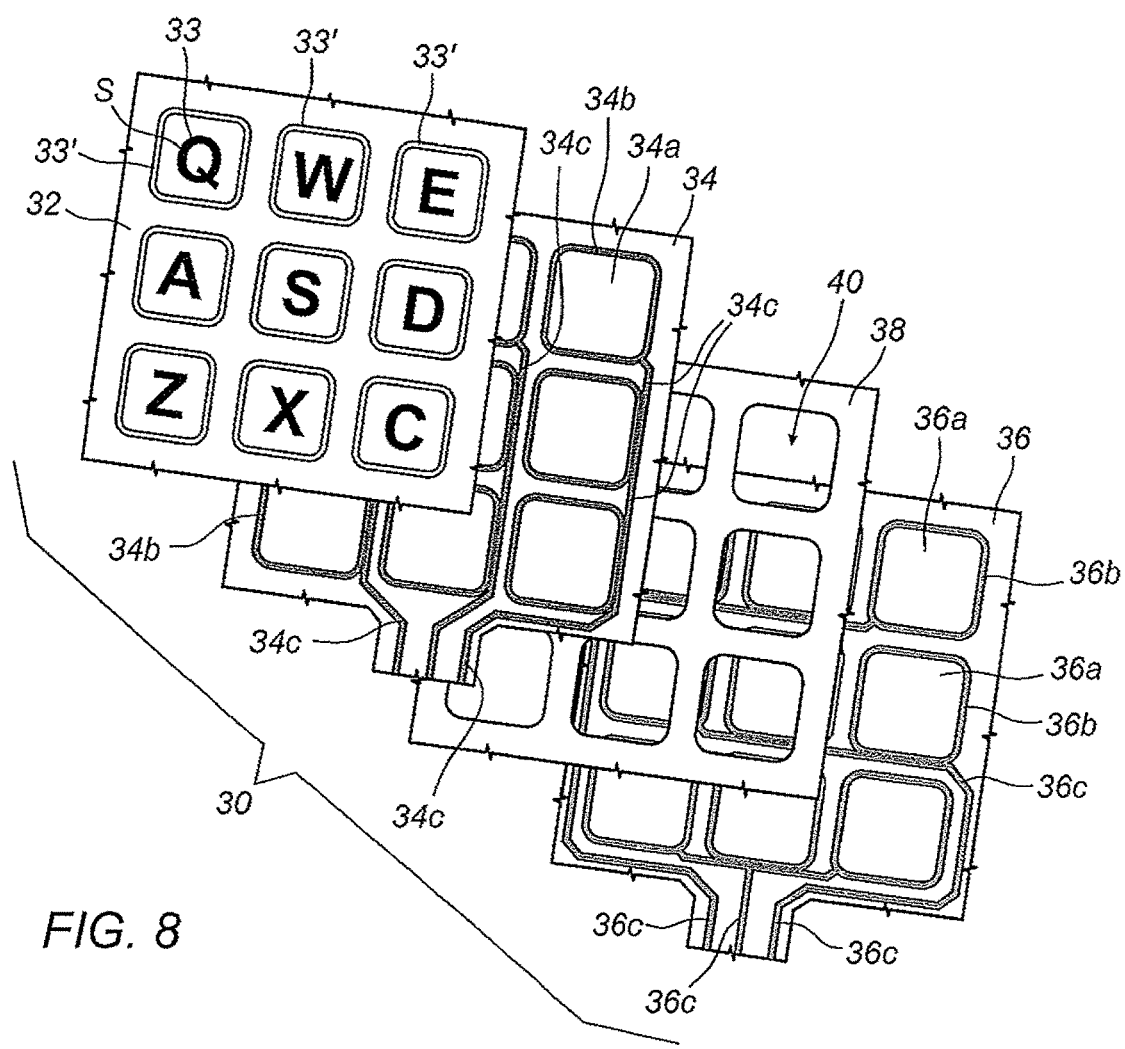

As may be seen from FIGS. 7 and 8, the part 30 of the device defining the typing keys, zones or elements comprises a top layer 32 defining a surface, denoted by the reference numeral 33, for engaging the user's fingers and defined by the top face of the layer 32. The part of the device defining the typing keys or zones thus comprises a top layer 32 which has a respective colour and zones of a different colour designating a respective symbol and possibly also a border defining a respective zone, element or key enclosing the symbol 33. More specifically, the colour of the top layer 32 is a black colour, which blocks the passage of light through it, whilst the colour of the zones designating a respective symbol and possibly also a border defining a respective key enclosing the symbol is a colour which does not block or only partly blocks the passage of light.

Figure 6:
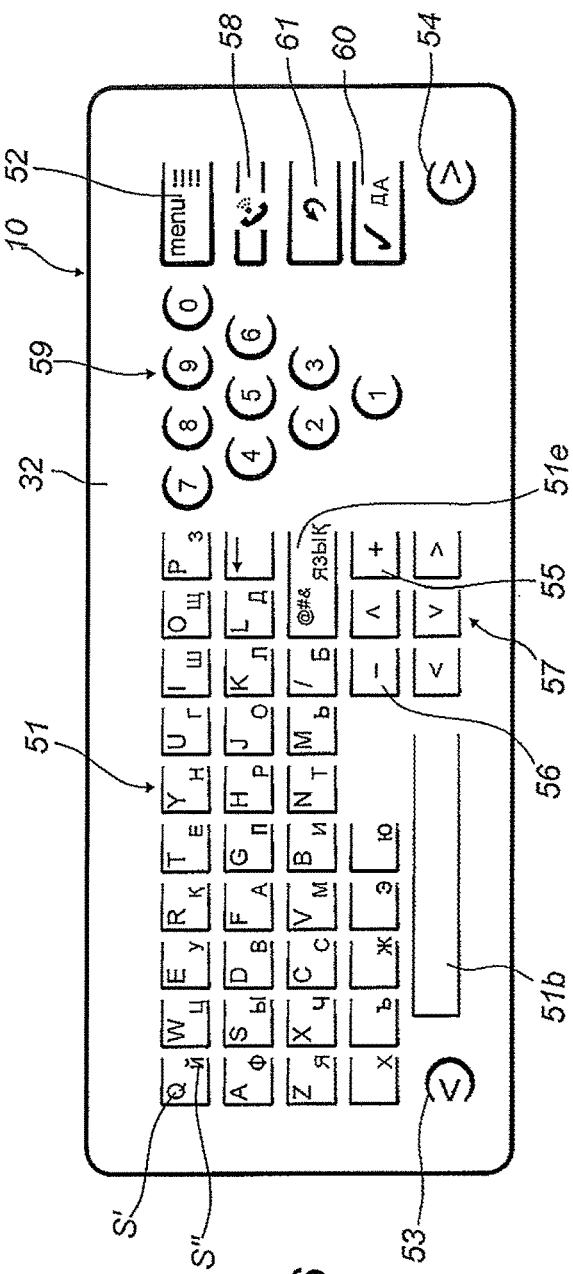
FIG. 6 is a plan view of a second embodiment of the device or keyboard according to the invention.

In practice, as may be seen from FIG. 6, in addition to a background area coloured black which does not allow light to pass through it, the top layer 32 of the keyboard may have zones defining a corresponding key which do allow light radiation to pass through, in particular at least a first zone S' and a second zone S'' which have a different degree of transparency to light radiation, in particular a different colour which emits a different colour shade. For example, the key might have a first zone S', in particular defining a main symbol of the key, which is uncoloured so as to allow light to pass through it completely, and a second zone S'', in particular defining a secondary symbol of the key, which is coloured red so as to emit a corresponding shade which is dimmer than that of the first zone.

Advantageously, the sheet (top layer) 32 is obtained from a transparent substrate which has a corresponding colour and which is made by screen printing. As illustrated, the part of the device defining the elements or keys to be pressed also comprises, under the top layer 32, a first and a second electrically conductive layer 34, 36, respectively upper and lower, between which there is an interposed separating layer 38, which has respective cavities at zones corresponding to respective typing elements, or keys on the top layer 32, in such a way that pressing the respective zone defining the respective typing element, or key, causes the upper electrically conductive layer 34 to make contact with the lower electrically conductive layer 36 through the respective cavity 40 formed in the middle, separating layer 38.

The separating layer 38 is advantageously made of an electrically insulating material, whilst the conductive layers 34 and 36 are made of a transparent material, for example polyester, where, at zones 34*a*, and 36*a*, transparent or semitransparent conductive ink or other material is provided, whilst the zones defining the border 34*b* and 36*b* of the zones 34*a* and 36*a* and of the zones defining the connections 34*c* and 36*c* are made of an electrically conductive opaque material or ink, for example a silver ink. This allows the central zone of the key to be optimally lit but prevents the illumination of one key from also illuminating the keys adjacent to it.

Advantageously, as may be seen from FIG. 4, the device comprises a bottom card 42 on which are mounted the LEDs 15, each of which is provided at a zone defining a typing element, or zone T. The device further comprises a support 44 which has or defines a plurality of hollows 46, each accommodating a respective lighting element 15, which is, in particular, positioned at a respective end of the respective hollow. Each hollow is provided at a respective key to be typed and is, in particular, located at a respective zone of the top part of the device which corresponds to a key to be typed. The support 44, interposed between the bottom card and the top part 30 of the device, is made preferably of plastic material and defines a plurality of holes 46, each accommodating a respective LED or lighting element. Each hole is provided at a respective zone of the top layer 30 defining a respective typing element or zone.

Advantageously, the device comprises mechanism(s) for diffusing the light radiation emitted by the respective lighting element 15 over the entire surface of the respective key. For this purpose, the support 44 has a plurality of through holes 46, each accommodating a respective lighting element 15, and whose longitudinal dimension or height is such as to define the mechanism(s) for diffusing the light radiation emitted by the respective lighting element 15 over the entire surface of the respective key.

The device further comprises a uniform layer 48 of transparent material which is interposed between the support 44 and the top layer 30 defining the typing elements or zones. This, too, allows the central zone of the key to be optimally lit but prevents the illumination of one key from also illuminating the keys adjacent to it.

Figure 9:
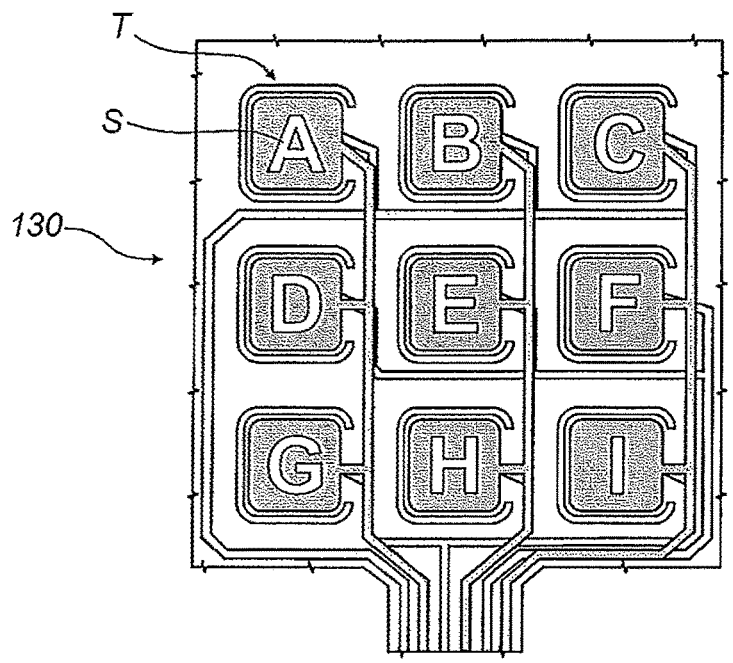
FIGS. 9 and 10 are a plan view and an exploded view of a detail of a second embodiment of the top of the device or keyboard.
Figure 10:
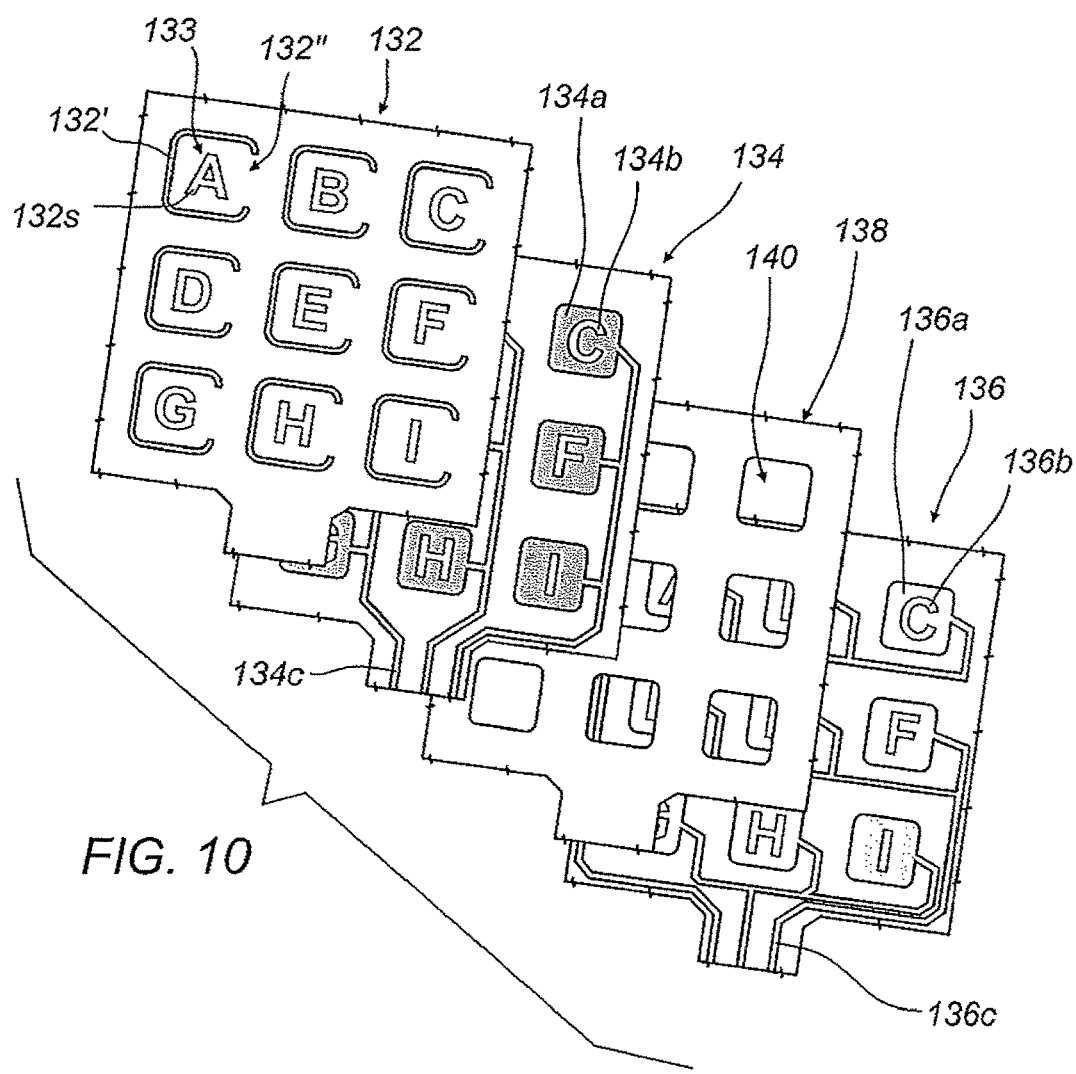

According to a further preferred embodiment, illustrated in FIGS. 9 and 10, the part 130 of the device defining the typing elements or zones comprises a top layer 132 defining a surface, denoted by the reference numeral 133, for engaging the user's fingers and defined by the top face of the layer 132, corresponding entirely to the top layer of the first preferred embodiment and therefore not described in detail again and which has a respective colour and zones of a different colour designating a respective symbol and possibly also a border defining a respective zone, element or key enclosing that symbol.

More specifically, the colour of the top layer 130 is a black colour, which blocks the passage of light through it, whilst the colour of the zones designating a respective symbol and possibly also a border defining a respective key enclosing the symbol is a colour which only partly blocks the passage of light and is, in particular a dark shade of grey. The sheet 132 of the second preferred embodiment, too, is obtained by screen printing.

In the second preferred embodiment, as well illustrated in FIG. 10, the part of the device defining the elements or keys to be pressed also comprises, under the top layer 132, a first and a second electrically conductive layer 134, 136, respectively upper and lower, between which there is an interposed separating layer 138, which has respective cavities 140 at zones corresponding to respective typing elements, or keys, on the top layer 132, in such a way that pressing the respective zone defining the respective typing element, or key, causes the upper electrically conductive layer 134 to make contact with the lower electrically conductive layer 136 through the respective cavity 140 formed in the middle, separating layer 138.

The separating layer 138 is the same as that of the first preferred embodiment, is not described in detail again, and it, too, is advantageously made of an electrically insulating material. The conductive layers 134 and 136 are, in turn, made of transparent material, for example polyester, like those of the first preferred embodiment, where, at zones 134*a*, and 136*a*, opaque electrically conductive inks, for example, a silver-based material or ink are provided, as at the zones defining the border, and the connections 134*c* and 136*c* are made of electrically conductive ink or material.

As illustrated, within the key zones 134*a* and 136*a* there are internal zones 134*b* and 136*b* without ink 134*a*, 136*a* which surrounds the zones 134*b*, 136*b*, the internal zones without conductive ink defining a respective symbol or sign of the key.

As illustrated, the key of the second preferred embodiment comprises a border 132' or line surrounding the symbol 132*s*, which has an open side 132", that is to say, a side where the line is missing, this open side being provided on the side of the key which corresponds in the underlying layers to the sides connecting the conductive zone 134*a*, 136*a* of the respective layer with the conductive connections 134*c* and 136*c*. Unlike here, the border in the first preferred embodiment illustrated in FIGS. 7 and 8 completely surrounds the symbol it encloses.

As illustrated in FIG. 2, at the control point of a respective lane, there is a stand 11 for supporting a respective keyboard 10. In practice, the stand 11 may be in the form of a column-like element having a foot 11*a* resting on the floor, a vertical upright or column 11*b* extending upwards from the respective foot 11*a*, and a supporting portion on which the typing device or keyboard 10 is mounted, which is located at the end of the upright 11*b* opposite the foot 11*a* and which is denoted by the reference label 11*c*. The supporting portion 11*c* on which the typing device or keyboard 10 is mounted, has in particular a corresponding wide supporting portion or plate having a rear face 11*d* and a front face 11*e* at which the typing device or keyboard 10, not illustrated in detail in FIG. 2, is provided. As illustrated, the keyboard supporting portion 11*c* is slightly inclined or oblique so that the device or keyboard is conveniently positioned relative to a user P, in particular relative to a user standing in front of the keyboard itself. As illustrated, the keyboard supporting portion 11*c* is set at an angle, in particular an obtuse angle, relative to the column 11b which it is integral with, at a respective top end opposite the base end which the foot 11a is integral with.

Advantageously, as may be seen from FIG. 2, the stand 11 which the typing device or keyboard 10 is mounted on, also mounts ambient lighting mechanism(s), denoted by the reference numeral 17, for illuminating the area around the device or player point. As illustrated, the ambient lighting mechanism(s) 17, for illuminating the area around the device are located at the back of the device or keyboard. Moreover, as may be seen, the ambient lighting mechanism(s) 17, for illuminating the area around the device face downwards so as to direct the light radiation or ambient illumination mainly downwards. The ambient lighting mechanism(s) 17 may be in the form of a respective LED which emits coloured light.

The invention described above is susceptible of industrial application. It would be obvious to one skilled in the art that several changes and modifications can be made to the invention without departing from the spirit and scope of the invention, described in depth above. In particular, one skilled in the art could easily imagine further embodiments of the invention comprising one or more of the features described herein. Moreover, it will be understood that all the details of the invention may be substituted by technically equivalent elements.

What is claimed:

1. An entertainment unit comprising a pedestal comprising a vertical column, a foot resting on a flooring and an integral keyboard support portion at an end of the vertical column opposite to the foot, the pedestal further having a keyboard mounted to the integral keyboard support portion at an obtuse angle relative to the vertical column of the pedestal such that the keyboard is inclined, and a backlighting system controlled by an entertainment system which comprises at least a centrally located system remote from the keyboard, the backlighting system comprises LED lights mounted on a backside of the keyboard and facing downward, and the pedestal and the keyboard are oriented and structured such that the LED lights light the flooring around the pedestal including at least the vertical column and behind the pedestal in a bowling centre including the foot.

2. The entertainment unit of claim 1, wherein the LED lights comprises a red, green and blue lighting system.

3. The entertainment unit of claim 1, wherein the LED lights are provided on a back of a console for a scoring system.

4. The entertainment unit of claim 1, wherein the backlighting system is managed by separate systems including the centrally located-system and a locally located system.

5. The entertainment unit of claim 1, wherein the backlighting system is customized and individually controlled for each of red, green and blue light, of each pedestal.

6. The entertainment unit of claim 1, wherein the pedestal is a console for a scoring system.

7. The entertainment unit of claim 6, wherein the console is positioned on an opposite side of a bowling lane from a pinspotter.

8. The entertainment unit of claim 1, wherein the LED such as direct light radiation or ambient illumination is directed downwards.

9. The entertainment unit of claim 1, further comprising a supporting portion or plate which the keyboard is mounted thereto.

10. The entertainment unit of claim 9, wherein the supporting portion or the plate is inclined.

11. The entertainment unit of claim 10, wherein the supporting portion is set at the obtuse angle, relative to the vertical column which it is integral with, at a respective top end opposite a base end which the foot is integral with.

12. The entertainment unit of claim 1, wherein the backlighting system is mounted in an orientation to light the flooring in front of the pedestal in the bowling centre.

* * * * *